United States Patent
Podolefsky et al.

(10) Patent No.: US 11,870,298 B2
(45) Date of Patent: Jan. 9, 2024

(54) TRAFFIC SIGNAL BATTERY BACKUP SYSTEM

(71) Applicant: Viridi Parente, Inc., Buffalo, NY (US)

(72) Inventors: Noah Podolefsky, Boulder, CO (US); Benjamin Lombardi, Byron, NY (US)

(73) Assignee: VIRIDI PARENTE, INC., Buffalo, NY (US)

( * ) Notice: Subject to any disclaimer, the term of this patent is extended or adjusted under 35 U.S.C. 154(b) by 0 days.

(21) Appl. No.: 17/716,327

(22) Filed: Apr. 8, 2022

(65) Prior Publication Data

US 2023/0327479 A1    Oct. 12, 2023

(51) Int. Cl.
| | |
|---|---|
| H02J 9/06 | (2006.01) |
| H02J 7/00 | (2006.01) |
| H02J 7/02 | (2016.01) |
| H02M 3/00 | (2006.01) |
| H02M 7/00 | (2006.01) |
| G08G 1/095 | (2006.01) |
| G16Y 10/40 | (2020.01) |
| G16Y 40/10 | (2020.01) |
| H04W 84/12 | (2009.01) |

(52) U.S. Cl.
CPC ............ *H02J 9/065* (2013.01); *H02J 7/0013* (2013.01); *H02J 7/0063* (2013.01); *H02J 7/02* (2013.01); *H02M 3/003* (2021.05); *H02M 7/003* (2013.01); *G08G 1/095* (2013.01); *G16Y 10/40* (2020.01); *G16Y 40/10* (2020.01); *H02J 2207/20* (2020.01); *H04W 84/12* (2013.01)

(58) Field of Classification Search
None
See application file for complete search history.

(56) References Cited

U.S. PATENT DOCUMENTS

| | | | |
|---|---|---|---|
| 5,898,389 A | 4/1999 | Deese et al. | |
| 9,413,457 B2 | 8/2016 | Pederson et al. | |
| 10,285,241 B2 | 5/2019 | Recker et al. | |
| 10,624,183 B1* | 4/2020 | Recker | H02J 7/0068 |
| 10,867,533 B2 | 12/2020 | Laforce et al. | |
| 10,879,729 B2 | 12/2020 | Hysell et al. | |
| 2002/0027510 A1* | 3/2002 | Jones | G08G 1/095 |
| | | | 340/693.2 |
| 2004/0070518 A1* | 4/2004 | Whittle, Jr. | G08G 1/095 |
| | | | 340/693.1 |
| 2007/0126599 A1 | 6/2007 | Gembala et al. | |

FOREIGN PATENT DOCUMENTS

WO    WO2011030920 A1    3/2011

\* cited by examiner

*Primary Examiner* — Jared Fureman
*Assistant Examiner* — Aqeel H Bukhari
(74) *Attorney, Agent, or Firm* — Emerson, Thomson & Bennett, LLC; Roger D. Emerson

(57) ABSTRACT

A traffic signal back-up system assembly is provided for supplying traffic signals and other traffic control devices with electrical energy if the primary supply of electrical energy from the utility company is interrupted or disconnected. With the use of a lithium-ion battery bank, this assembly can store enough electrical energy to power a traffic signal for several days without restoration of the primary source of electrical energy. This assembly can be installed inside, on, or apart from the traffic signal control box as needed.

9 Claims, 8 Drawing Sheets

TRAFFIC SIGNAL BATTERY BACKUP SYSTEM

I. BACKGROUND

A. Field of the Invention

This invention generally relates to methods and apparatuses related to offering backup power to traffic signals in the event of a power outage and more specifically to methods and apparatuses related to electrical energy storage for traffic signals.

B. Description of Related Art

Traffic signals are an integral part of the road system and traffic safety. They provide directions to drivers to prevent accidents and collisions. These devices require electrical energy to operate. There are several methods of supplying electrical energy to these devices, including but not limited to utility power, solar panels, and battery backups. Without a source of electrical energy, or if the supply of electrical energy to these devices is interrupted, these devices will not function as intended, which can confuse motorists and lead to accidents and collisions.

It is known to provide a gasoline generator system for supplying backup power to a traffic signal. However, such systems are typically manually deployed, and require down time for service personnel to arrive on the scene and configure the system. This results in extended delays and down time for motorists, which exacerbates the aforementioned problems.

What is needed is a device that will store electrical energy for use by traffic signals in case of a power outage. This invention will provide numerous other advantages as will be readily understood by a person of ordinary skill in the art.

II. Summary

This disclosure describes a device that will store electrical energy within lithium-ion batteries to provide electrical energy to traffic control devices in the case of a power outage. Further, these batteries will be contained in an enclosure that is functionally separate from any existing enclosure. This device is comprised of one or more rechargeable battery members, an inverter member, a DC/DC converter member, and a telematic device. This enclosed device can be placed within a control enclosure for the traffic control device, mounted to an outside of the control enclosure for the traffic control device, or mounted at a separate location in the intersection containing the traffic control device. The traffic control device can be one of the following: a traffic signal, a traffic camera, a traffic motion/proximity sensor, a streetlight, a crosswalk signal, other traffic control device, or a device in close proximity to a traffic control device.

The rechargeable battery member includes the one or more battery cells in a battery bank. Further, the battery bank is expandable to include at least one additional rechargeable battery bank member. The DC/DC converter member is a buck converter. The telematic device can receive and deliver wired and wireless communications from other external components such as networks and wired or wireless devices.

An alternate embodiment of the traffic signal battery back-up system assembly includes one or more rechargeable battery members each including a battery bank containing one or more battery cells. A DC/AC converter converts direct current electrical power stored in the battery member to alternating current usable by traffic signal components in the event of a power outage, and, upon restoration of power after the outage, receiving external alternating current and converting to direct current electrical power to recharge the battery member. The converter is configured to detect the power outage and switch to the battery member within a predetermined switching time, preferably 50 milliseconds. An energy storage system monitoring component monitors external power levels to the traffic signal components and instructs the DC/AC converter to switch back and forth between external power and the battery member. An IOT (Internet Of Things) gate component provides Wi-Fi connectivity for wirelessly transmitting monitored data of the monitoring component to a control center enabling remote access and control to an operator.

In one aspect, the IOT gate is configured to send a text or email to an operator notifying them of a monitored function of the system. In another aspect, the monitoring component is configured for a delay reestablishing grid power, to ensure that power from the external grid is stable and will not cut out again. The delay is preferably 15 seconds.

In another aspect of the invention, the traffic signal back-up system assembly includes an enclosure for retaining the battery member, the DC/AC converter, the monitoring component, and the IOT gate component. An exhaust fan is provided for blowing warm air from the enclosure into ambient surroundings via an exhaust vent. A thermostat monitors temperature inside the enclosure and activates the exhaust fan to expel the warm air from the enclosure. An intake vent is inside of the enclosure to allow ambient air from outside the enclosure to enter and thereby provide air circulation.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
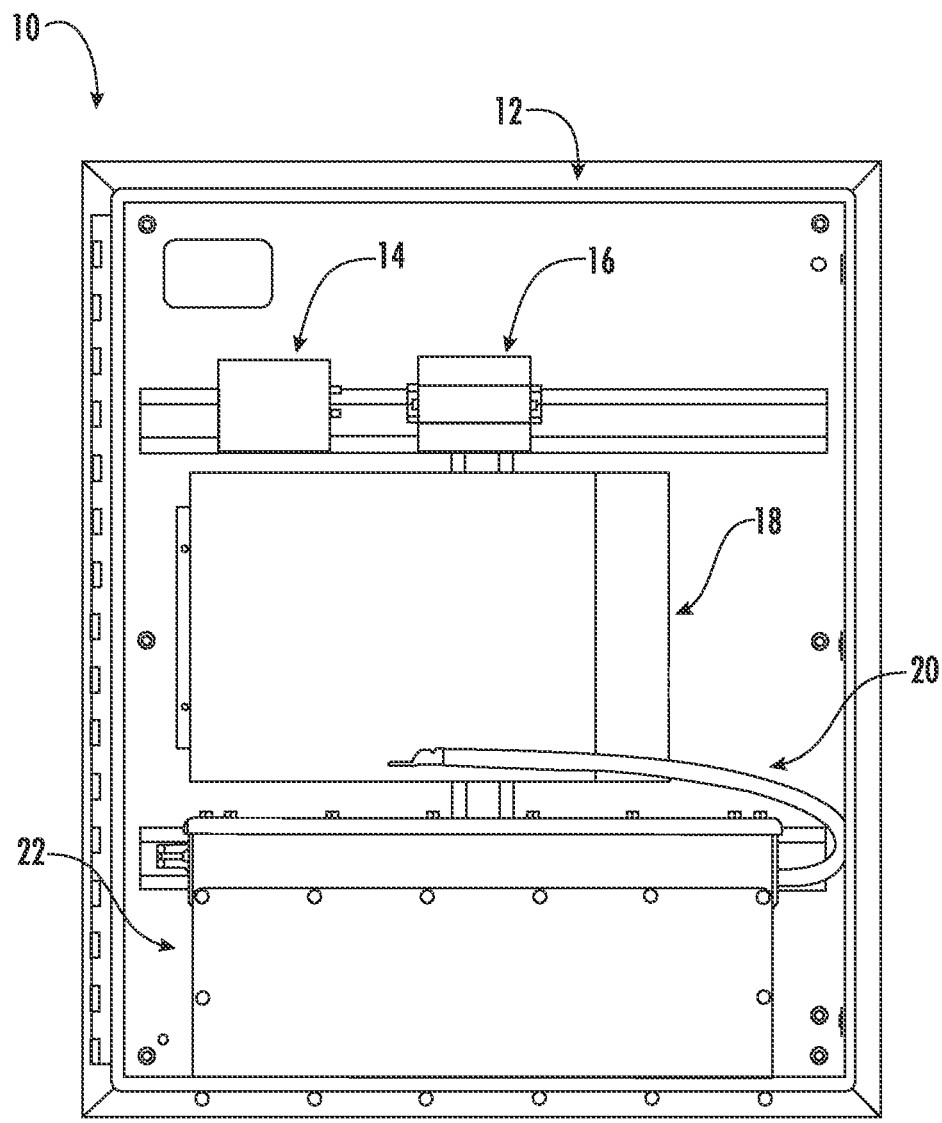
FIG. 1 is a perspective front view of a battery backup assembly contained within an enclosure according to some embodiments of this invention.

Referring now to the drawing wherein the showings are for purposes of illustrating embodiments of the invention only and not for purposes of limiting the same, and wherein like reference numerals are understood to refer to like components.

FIG. 1 depicts a battery backup system assembly 10 for storing DC electrical energy for use by a traffic control device contained within enclosure 12. The assembly 10 depicted in FIG. 1 has four major electrical components, which include a telematics device 14, a DC/DC converter 16, an inverter 18, and a lithium-ion rechargeable battery bank 22. Conductor cable 20 connects the battery bank 22 to the inverter 18.

The battery bank 22 depicted in FIG. 1 is supplied with electrical energy from an outside source. This outside electrical energy source, which is an AC source, is converted into DC electrical energy by means of a full wave rectifier.

The inverter 18 depicted in FIG. 1 is supplied with electrical energy from the battery bank 22 via conductor cable 20. This electrical energy provided by the battery bank 22 to the inverter 18 is DC electrical energy. The inverter 18 depicted in FIG. 1 converts the DC electrical energy supplied by the battery bank 22 into AC electrical energy.

The DC/DC converter 16 depicted in FIG. 1 is supplied with DC electrical energy from the battery bank 22 via a conductor cable. The DC/DC converter 16 depicted in FIG. 1 transforms the voltage of the DC electrical energy received from the battery bank 22 to match the DC voltage needs of the telematics device 14. The DC/DC converter 16 depicted in FIG. 1 is a buck converter.

The telematics device 14 depicted in FIG. 1 is supplied with electrical energy from the DC/DC converter 16 via a conductor cable. This electrical energy provided by the DC/DC converter 16 is DC electrical energy. The telematics device 14 depicted in FIG. 1 receives and delivers communications to an external component by means of a: wireless cellular connection; or wired connection. The devices that the telematics device 14 depicted in FIG. 1 can communicate with are: wireless cellular devices; wireless networks; or devices possessing a hardwired connection to the telematics device.

The inverter 18 depicted in FIG. 1 provides electrical energy to the traffic control device via conductor cables from the battery bank 22 when the primary source of electrical energy to the traffic control device is interrupted. This electrical energy provided by the inverter 18 is AC electrical energy.

The traffic control device described hereinabove can be a traffic signal, a traffic camera, a traffic motion/proximity sensor, a streetlight, a crosswalk signal, or another device related to or in close proximity to a traffic control device using AC electrical energy.

As described herein, the present traffic signal battery backup system is preferably located proximate to the site of the traffic light. The present traffic signal battery backup system is preferably mounted on a pole or ground-based platform adjoining the traffic light. The present traffic signal battery backup system can be one component in a network of such systems for supplying backup power to a municipal grid or other type of network, all without departing from the invention.

Depicted in FIGS. 2-7 is an alternative embodiment of a battery backup system 110 having an enclosure 112. As specifically shown in FIGS. 2, 3 and 4, an IOT Gate component 114 is included (where IOT stands for "internet of things") for providing Wi-Fi connectivity for the battery backup system 110, and for enabling remote access and control to an operator at a remote location. The IOT Gate component 114 enables an operator to connect remotely to the system 110 and monitor functions of the system 110 and battery bank (described hereinbelow). The IOT Gate 114 can wirelessly transmit monitored data to a control center, (or alternatively over a wired network). Alternately, the IOT Gate 114 can be configured to send a text or email to an operator notifying them of a power outage or any other monitored function of the system 110.

Figure 3:
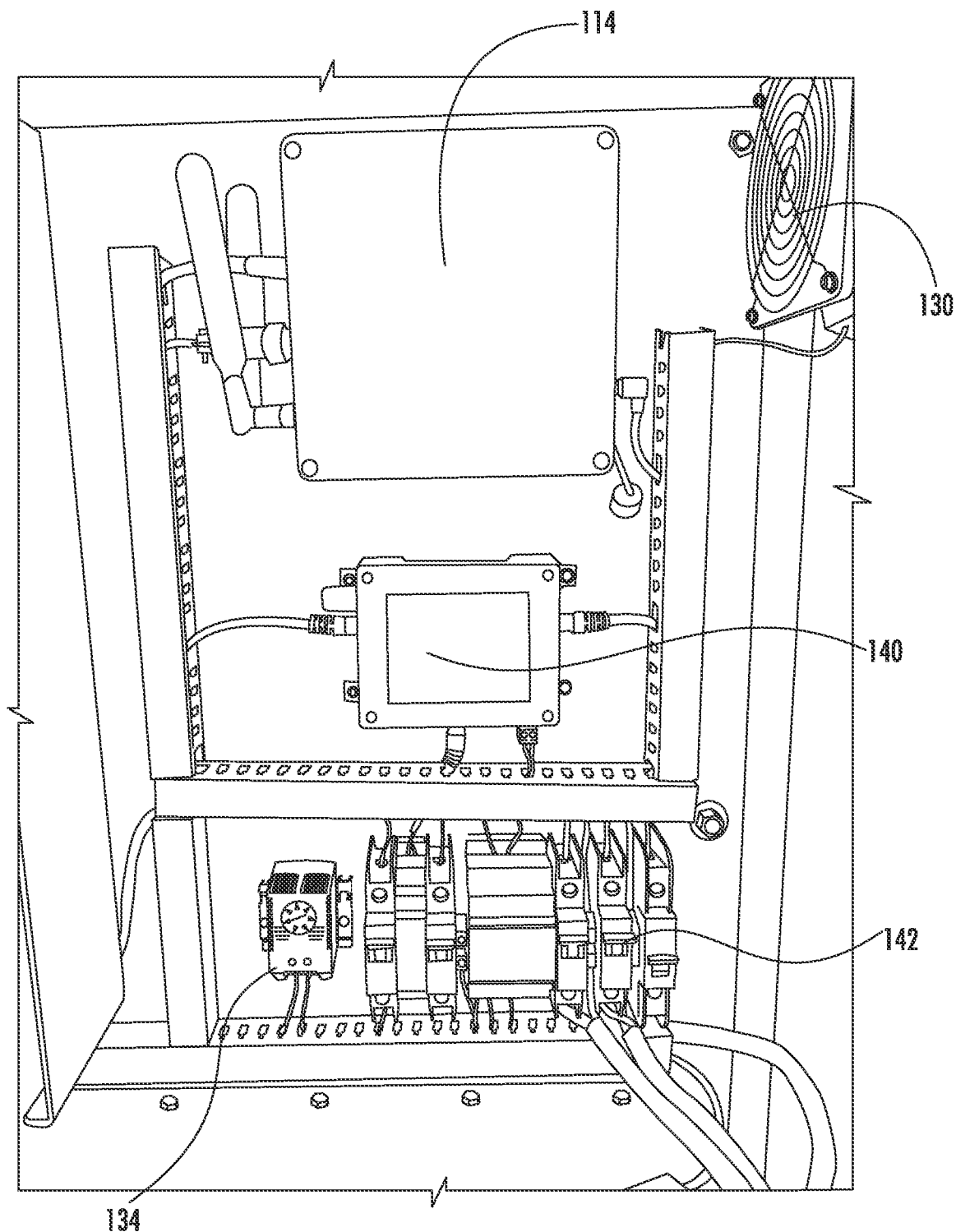
FIG. 3 is a close-up front view of a battery backup assembly featuring certain components according to some alternate embodiments of this invention.
Figure 4:
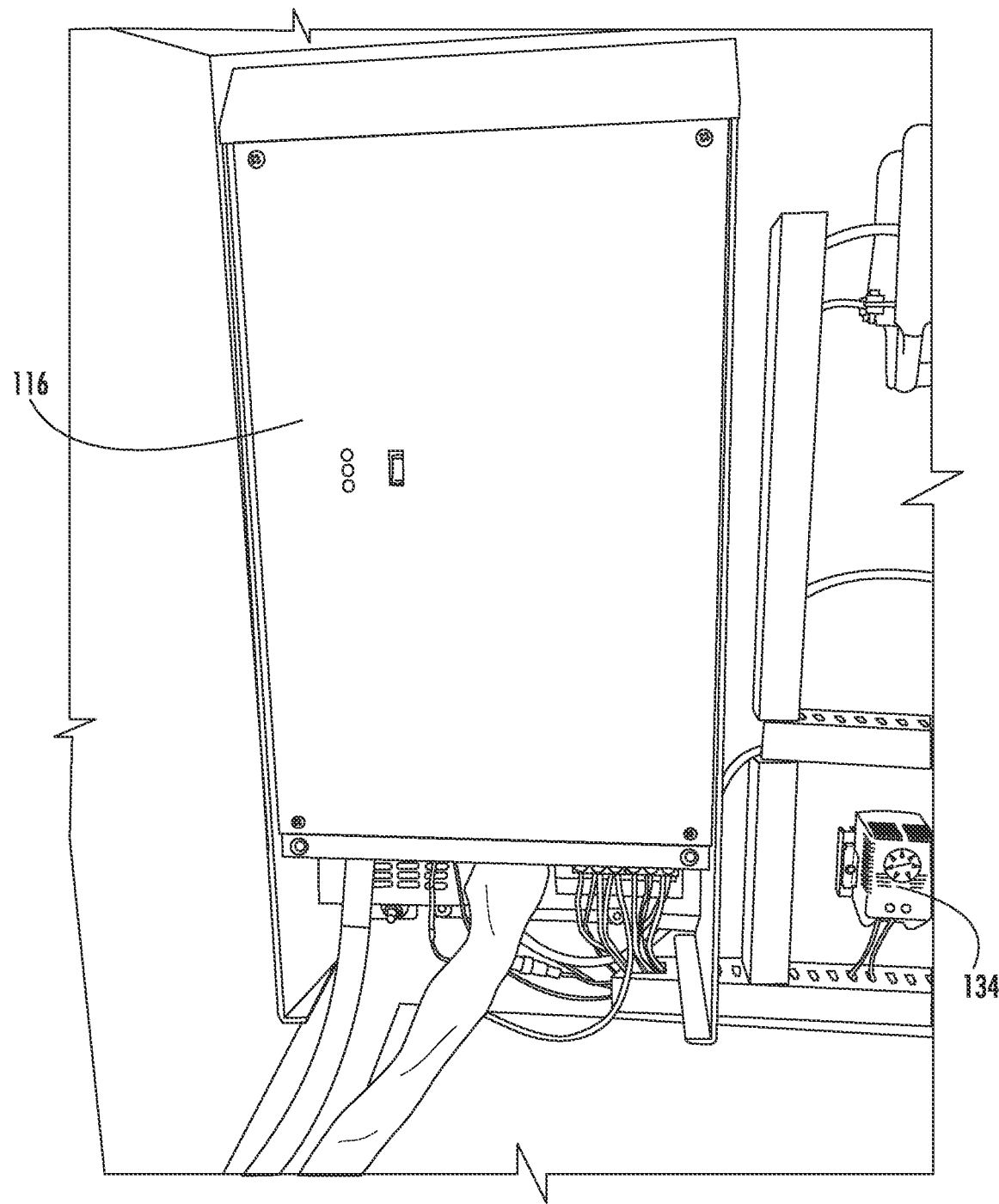
FIG. 4 is a front view focusing on a converter of a battery backup assembly according to some alternate embodiments of this invention.

With specific reference to FIGS. 1, and 3, a DC/AC converter 116 is provided which converts DC power to AC power for converting direct current electrical power stored in the system to alternating current usable by the traffic signal components of the system 110. The converter 116 can thus convert DC power from the battery and supply AC electrical power to the traffic signal in the event of an outage. Conversely, upon restoration of power after an outage, the convertor 116 can receive AC power from the same electrical grid that powers the traffic signal and convert to DC electrical power to recharge the battery.

With further reference to the DC/AC converter 116 shown in FIGS. 1 and 3, the converter 116 includes software code instructions for detecting a loss of normal power to the traffic signal from the electrical grid and immediately switching to the present battery backup system 110. The switching time of the converter 116 is preferably 50 milliseconds, thereby providing a seamless, automatic transition from grid power to backup power that is undetectable to motorists, thereby providing safe, constant, reliable operation of the traffic signal.

Figure 2:
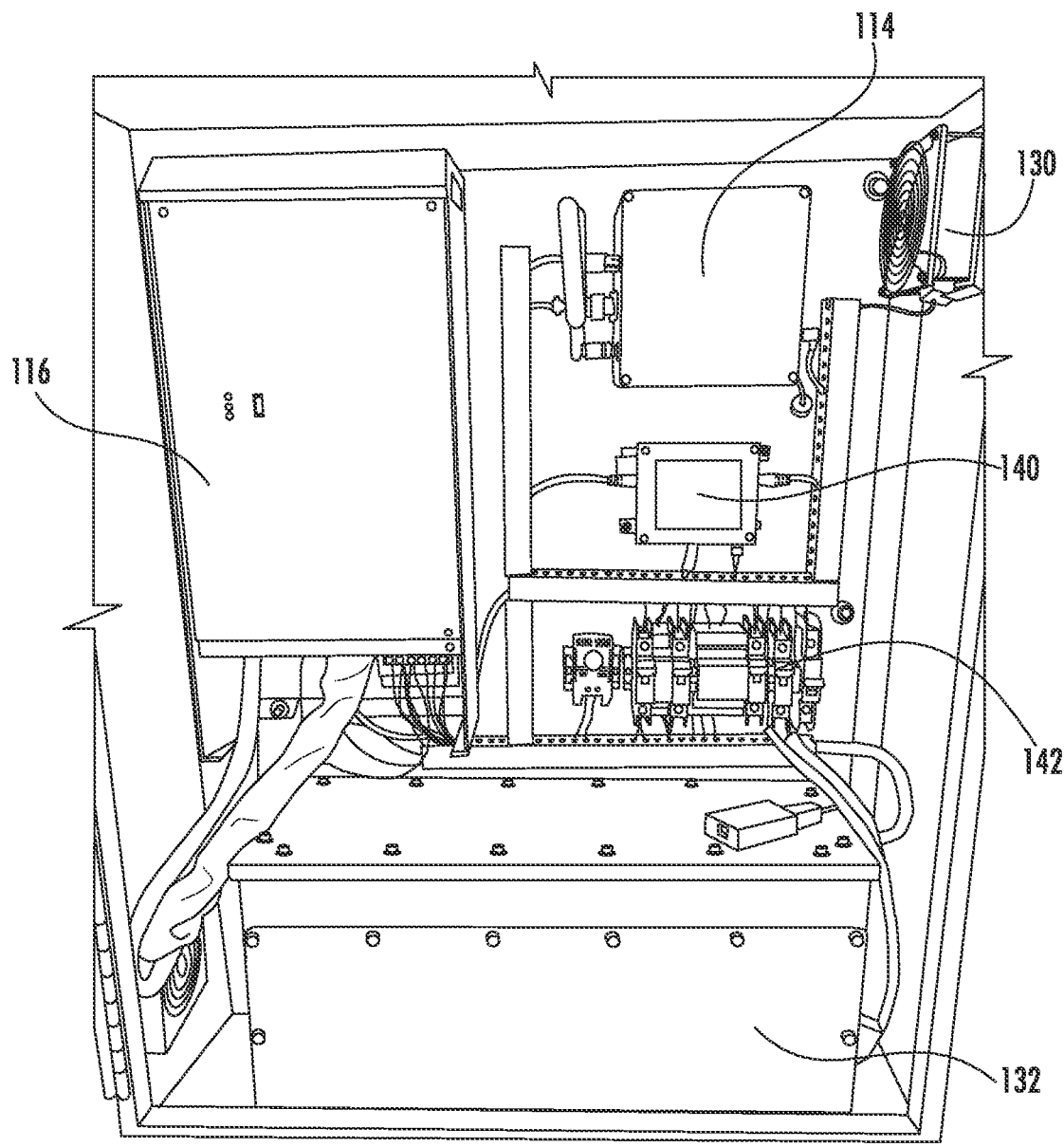
FIG. 2 is a front view of a battery backup assembly indicating specific components according to some alternate embodiments of this invention.
Figure 5:
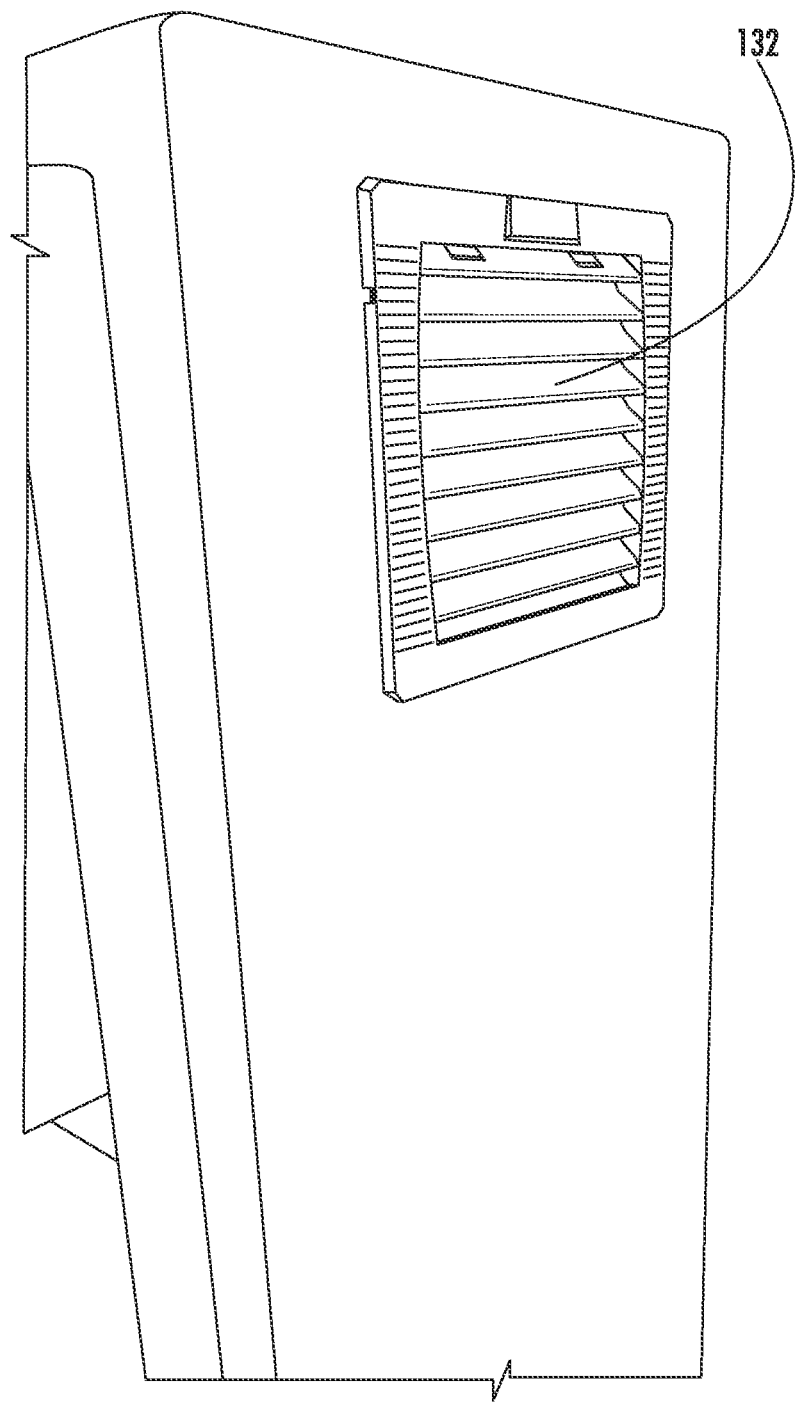
FIG. 5 is a side view of a battery backup assembly indicating an exhaust vent according to some alternate embodiments of this invention.

With reference to FIGS. 2, 3, and 5, an exhaust fan 130 is provided for blowing warm air from the inside of the enclosure 112 to the ambient surroundings via an exhaust vent 132 which is formed on the outside of the enclosure 112. In this manner, cooling is provided so that temperatures are reduced inside the enclosure 112. A thermostat 134 monitors temperature inside the enclosure 112 and is programmed to detect a specific temperature level. When the temperature inside the enclosure 112 reaches the specific temperature level, it sends a signal to activate the exhaust fan 130 to expel the warm air from the enclosure 112.

With reference to FIGS. 2 and 3, an energy storage system monitoring component 140 is provided. The monitoring component 140 can monitor power levels from the electrical grid and can instruct the converter 116 to switch back and forth between grid and battery power, based on availability of grid power. When grid power returns, the monitoring component 140 can turn off the present system and return traffic signal function to regular grid power. The monitoring component 140 can program in a suitable delay, such as 15 seconds for example, before reestablishing grid power, to ensure that power from the external grid is stable and will not cut out again.

As also shown in FIGS. 2 and 3, circuit breakers 142 are provided for detecting overload conditions and providing suitable protection to the various components. The circuit breakers 142 can provide protection to the system 110 from power spikes originating in the external electrical grid. The breakers 142 can also provide protection to the traffic signal from outgoing power originating in the system 110. The breakers 142 can also provide internal protection from surges of the components within the system from each other, such as short circuits that might occur with the converter 116, exhaust fan 130, etc.

As specifically shown in FIG. 2, a rechargeable battery bank 122 is provided. The battery bank 122 can be any suitable component such as a lithium-ion battery assembly or other suitable component. In the preferred embodiment, the battery bank can be a platform such as an RPS5 platform of the type sold by Viridi Parente, the applicant and assignee of the present invention. Such a battery bank 122 can provide seamless backup electrical power to a traffic signal for up to 20 hours, depending on the number of lights used within a specific traffic signal, and other factors including illuminance, type of light source, or other factors that can impact power consumption of a traffic signal.

Figure 6:
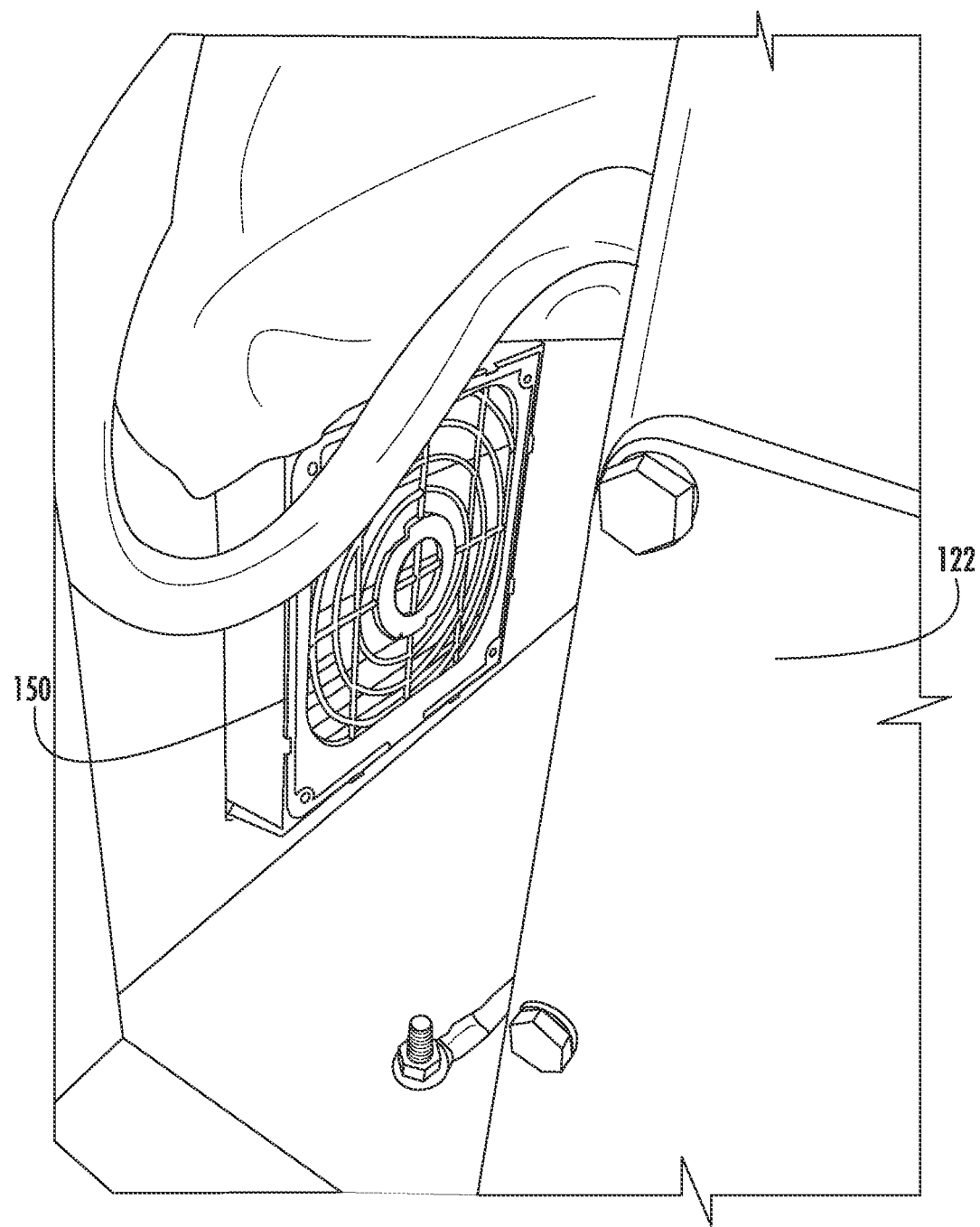
FIG. 6 is a perspective view of the interior of the battery backup assembly indicating an intake within the enclosure according to some alternate embodiments of this invention.
Figure 7:
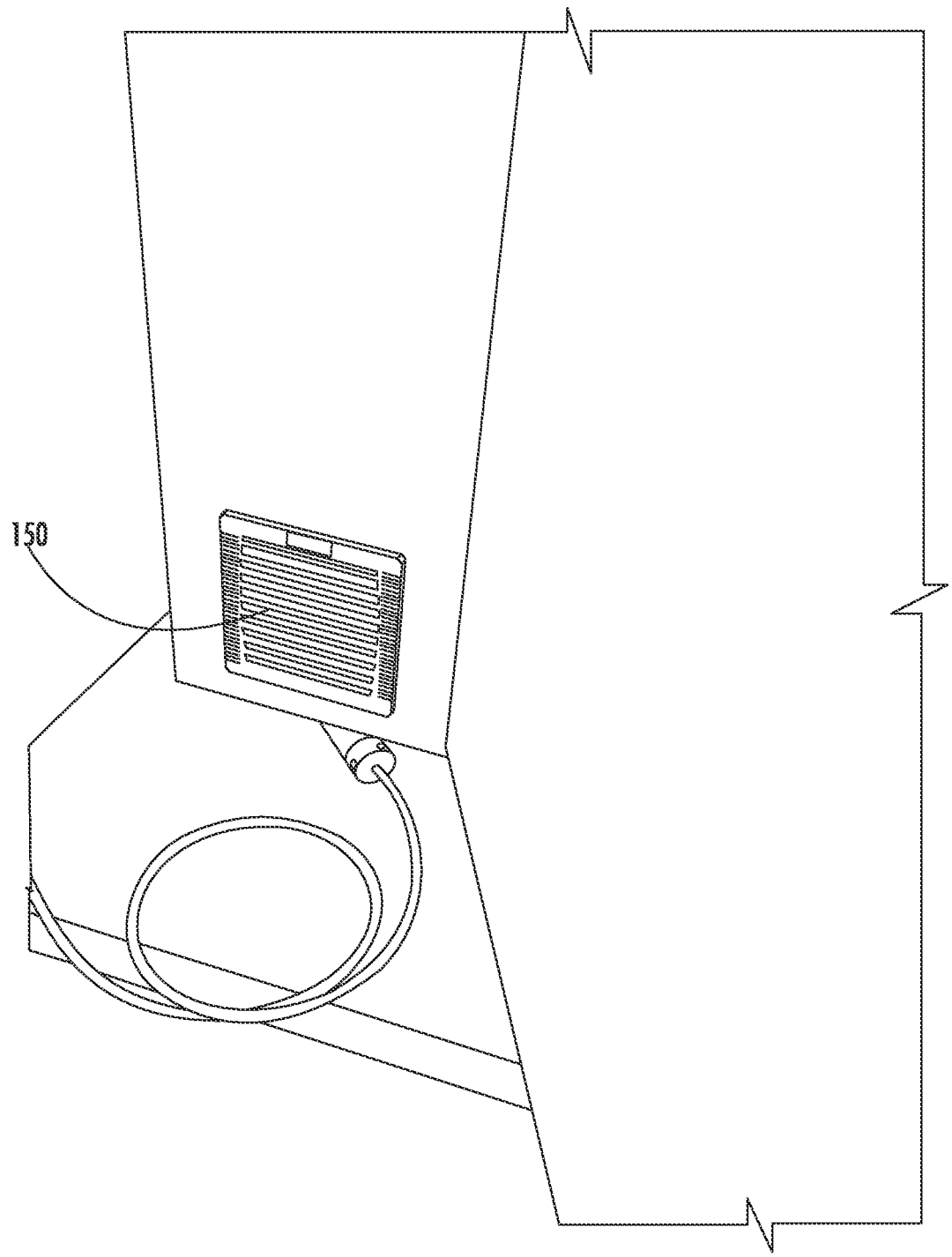
FIG. 7 is a side view of a battery backup assembly including the intake outside the enclosure according to some alternate embodiments of this invention.

With reference to FIGS. 6 and 7, an intake vent 150 is retained on the inside of the enclosure 112. The intake vent 150 allows ambient air from outside the enclosure 112 to enter and thereby provide air circulation. Preferably, the intake vent 150 is mounted near the bottom of the enclosure 112 while the exhaust fan 130 is mounted near the top of the enclosure 112, thereby providing a convectively rising column of air through the enclosure 112 for circulation.

Figure 8:
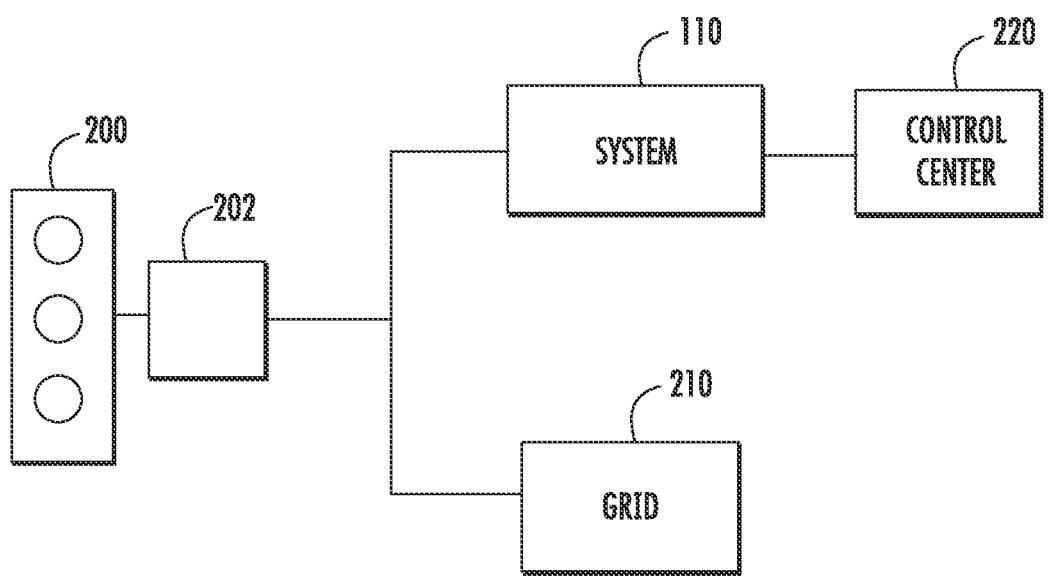
FIG. 8 is a schematic showing the relationship between the present battery backup system and the traffic signal and electrical power grid in accordance with some alternate embodiments of this invention.

With reference to the schematic of FIG. 8, the present battery backup system 110 is electrically connect to the traffic signal 200 with control components 202 and configured to supply electrical power to the traffic signal 200 in the event of a failure of the electrical power grid 210. The present battery backup system 110 is primarily an automated system in communication with a control center 220 where a human operator can communicate and intervene if necessary to optionally take control of the system 110 in accordance with the requirements of a specific situation. Other such related configurations can be contemplated, such as multiple battery backup systems 110 that can communicate with one or more control centers 220, all without departing from the invention.

Numerous embodiments have been described herein. It will be apparent to those with ordinary skill in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

Having thus described the invention, it is now claimed:

1. A traffic signal battery back-up system assembly comprising:
    at least one rechargeable battery member, comprising a battery bank containing at least one battery cell;
    an inverter, electrically connected to the at least one rechargeable battery member, for providing a flow of AC electrical energy from the at least one rechargeable battery member to a traffic control device;
    a telematic device for receiving communications from an external component, wherein the telematic device controls operation of the flow of DC electrical energy from the at least one rechargeable battery member to the inverter, and for delivering communications to an external component, wherein the telematic device notifies an external component of the current state of the traffic signal back-up system; and
    a DC/DC converter member, electrically connected to the at least one rechargeable battery member, for providing a flow of DC electrical energy from the at least one rechargeable battery member to the telematic device.

2. The traffic signal back-up system assembly of claim 1, wherein the one or more rechargeable battery members are lithium-ion batteries.

3. The traffic signal back-up system assembly of claim 1, wherein the battery bank is expandable to include at least one additional rechargeable battery bank member.

4. The traffic signal back-up system assembly of claim 1, wherein the telematic device supplies electrical energy from the lithium-ion battery bank and communicates with outside devices and networks, in the case of an outage of the primary source of electrical energy to the traffic control device.

5. The traffic signal back-up system assembly of claim 1, further comprising an enclosure which is selectively placed within: a control enclosure for the traffic control device; mounted to an outside of the control enclosure for the traffic control device; or mounted at a separate location in the intersection containing the traffic control device.

6. The traffic signal back-up system assembly of claim 1, wherein the traffic control device is one of: a traffic signal; a traffic camera; a traffic motion/proximity sensor; a streetlight; a crosswalk signal, other traffic control device, or a device in close proximity to a traffic control device.

7. The traffic signal back-up system assembly of claim 1, wherein the external component is one of: a device; or a network.

8. The external component of claim 7, wherein the device or network is one of: a wireless device; a wired device; or a network.

9. The traffic signal back-up system assembly of claim 1, wherein the DC/DC converter member is a buck converter.

* * * * *